United States Patent
Hedtke

(10) Patent No.: US 9,568,387 B2
(45) Date of Patent: Feb. 14, 2017

(54) THERMAL DIAGNOSTIC FOR SINGLE-CRYSTAL PROCESS FLUID PRESSURE SENSOR

(75) Inventor: Robert C. Hedtke, Young America, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 13/569,894

(22) Filed: Aug. 8, 2012

(65) Prior Publication Data
US 2014/0041437 A1 Feb. 13, 2014

(51) Int. Cl.
*G01L 27/00* (2006.01)
*G01L 9/00* (2006.01)

(52) U.S. Cl.
CPC .......... *G01L 9/0075* (2013.01); *G01L 27/007* (2013.01)

(58) Field of Classification Search
CPC ...... G01L 27/005; G01L 27/002; G01L 23/10; G01L 27/00; G01M 15/08; G01N 25/00
USPC .... 73/1.75, 25.01, 442, 54.42, 61.46, 61.74, 73/61.76, 114.18, 862.581
See application file for complete search history.

(56) References Cited

U.S. PATENT DOCUMENTS

| | | | |
|---|---|---|---|
| 5,355,712 A * | 10/1994 | Petersen | G01L 9/0042 73/1.38 |
| 6,089,097 A | 7/2000 | Frick et al. | |
| 6,357,298 B1 * | 3/2002 | Draxelmayr | G01D 5/24 73/724 |
| 6,508,129 B1 | 1/2003 | Sittler | 73/756 |
| 7,255,012 B2 * | 8/2007 | Hedtke | G05D 7/0635 73/861.61 |
| 7,918,134 B2 | 4/2011 | Hedtke et al. | 73/718 |
| 7,992,445 B2 | 8/2011 | Kobayashi et al. | |
| 2002/0181543 A1 * | 12/2002 | Yin | G01K 15/00 374/170 |
| 2006/0112773 A1 | 6/2006 | Hedtke | |
| 2010/0192694 A1 * | 8/2010 | Hammerschmidt | B60C 23/0408 73/708 |

(Continued)

FOREIGN PATENT DOCUMENTS

CN 1228014 9/1999
CN 101160508 4/2008

(Continued)

OTHER PUBLICATIONS

International Search Report and Written Opinion of the International Searching Authority, or the Declaration for International U.S. Appl. No. PCT/US2013/047005, filed Jun. 21, 2013.
Communication from European Application No. 13733213.6, dated Mar. 19, 2015.
Office Action from Chinese Application No. 201210397328.2, dated Feb. 28, 2015.

(Continued)

*Primary Examiner* — Eric S McCall
*Assistant Examiner* — Mohammed E Keramet-Amircolai
(74) *Attorney, Agent, or Firm* — Westman, Champlin & Koehler, P.A.

(57) ABSTRACT

A method of verifying a condition of a single-crystal pressure sensor is provided. The method includes providing a single-crystal pressure sensor that has at least one electrical characteristic that varies with applied pressure being coupled to a first output and a second output. The pressure sensor also has at least one resistive element therein. A current is applied through the resistive element to heat the pressure sensor. At least one output of the pressure sensor is monitored to determine a response of the pressure sensor to current-induced heat. A verification output is provided based on the response.

30 Claims, 4 Drawing Sheets

(56) References Cited

U.S. PATENT DOCUMENTS

| | | | | |
|---|---|---|---|---|
| 2011/0128003 A1* | 6/2011 | Thompson | ............... | E21B 47/06 324/337 |
| 2011/0308323 A1* | 12/2011 | Oizumi | ................. | G01L 9/0042 73/721 |
| 2012/0105092 A1* | 5/2012 | Abiru | .................. | G01M 99/008 324/760.01 |

FOREIGN PATENT DOCUMENTS

| | | |
|---|---|---|
| CN | 102232203 | 11/2010 |
| DE | 102 03 484 A1 | 12/2002 |
| SU | 1000804 | 2/1983 |
| WO | WO 92/10763 | 6/1992 |
| WO | WO 94/29572 | 12/1994 |

OTHER PUBLICATIONS

Translation of Office Action from Chinese Application No. 201210397328.2, dated Sep. 25, 2015.
Office Action from Australian Patent Application No. 2013300083, dated Mar. 4, 2016.
Office Action from Russian Patent Application No. 2015102524, dated Feb. 19, 2016.
Office Action from Canadian Application No. 2,878,920, dated Dec. 11, 2015.
Office Action from Chinese Application No. 201210397328.2, dated Sep. 25, 2015.
Examination Report in Australian Patent Application No. 2013300083 dated Aug. 12, 2016.
Office Action from Japanese Patent Application No. 2015-526538, dated Mar. 9, 2016.

* cited by examiner

US 9,568,387 B2

THERMAL DIAGNOSTIC FOR SINGLE-CRYSTAL PROCESS FLUID PRESSURE SENSOR

BACKGROUND

Pressure sensors are used to measure pressures in a number of industrial applications. One type of pressure sensor is known as a deflectable-diaphragm pressure sensor. In these pressure sensors, a pressure is applied, either directly or through an incompressible fill fluid, to a deflectable diaphragm. An electrode, such as a capacitive plate, is coupled to the deflectable diaphragm such that movement of the diaphragm plate changes an electrical characteristic, such as capacitance, which can be measured and related to the pressure. Deflectable-diaphragm based pressure sensors are used in differential, absolute, and gage pressure sensors.

Pressure sensors frequently operate in harsh environments such as high process temperatures or corrosive process fluids. One technique which has been used under such harsh conditions is to separate and isolate the pressure sensor from the process fluid whose pressure is being measured. One technique uses an isolation diaphragm which has process fluid on one side and an isolation fluid is on the other side. The isolation fluid couples the isolation diaphragm to the sensing diaphragm of the pressure sensor. As the process fluid pressure changes, the isolation diaphragm responsively deflects which causes the change in pressure to be transferred through the isolation fluid to the pressure sensor diaphragm. Pressure sensors with isolation diaphragms are well known in the art. However, to create such an isolated system adds cost and complexity. Further, the fluid can leak due to over pressure or mechanical damage resulting in loss of fluid volume or fill fluid which has been contaminated by process fluid.

In some applications, it is desirable to use a single-crystal pressure sensor. Single-crystal pressure sensors offer a number of advantages over other types of deflectable-diaphragm pressure sensors. The single-crystal pressure sensor provides extremely low hysteresis, high frequency response, and extreme resistance to both chemical attack and thermal breakdown. One particular single-crystal pressure sensor is constructed from sapphire. Since the single-crystal pressure sensor has such extreme resistance to chemical attack and thermal breakdown, it can be used in applications where no fill fluid is used. Thus, the process fluid may directly contact the single-crystal pressure sensor diaphragm. Accordingly, for some applications, single-crystal pressure sensors are a primary choice for process fluid pressure measurement.

While the process control measurement industry has developed significant diagnostic capabilities for determining the health and operational status of process communication, process device electronics, and even some process sensors, such diagnostics for single-crystal pressure sensors have not been developed. U.S. Pat. No. 7,918,134 provides a thermal-based diagnostic system for a pressure transmitter where a heat pulse is applied to a fill fluid in a process fluid pressure transmitter. The heat pulse affects the volume of the fill fluid and the changing volume can be measured with the pressure sensor in order to diagnose and/or verify operation of the pressure sensor. While such diagnostics are highly useful for fill fluid-based process fluid pressure sensor systems, they do not address applications where no such fill fluid is provided. Specifically, in some single-crystal pressure sensor applications, the process fluid itself is applied directly to the deflectable diaphragm of the pressure sensor. Accordingly, there is no fill fluid, and thus the diagnostics of the '134 patent are not usable.

Providing enhanced diagnostics and verification relative to single-crystal pressure sensors would increase the reliability and enhance field maintenance relative to applications where such sensors are employed.

SUMMARY

A method of verifying a condition of a single-crystal-pressure sensor is provided. The method includes providing a single crystal pressure sensor that has at least one electrical characteristic that varies with applied pressure being coupled to a first output and a second output. The pressure sensor also has at least one resistive element therein. A current is applied through the resistive element to heat the pressure sensor. At least one output of the pressure sensor is monitored to determine a response of the pressure sensor to current-induced heat. A verification output is provided based on the response.

DETAILED DESCRIPTION OF ILLUSTRATIVE EMBODIMENTS

Single-crystal process fluid pressure sensors, and sapphire-based single-crystal process fluid pressure sensors in particular, are known. For example, U.S. Pat. Nos. 6,089,097 and 6,508,129 report the design and utilization of such sensors. Embodiments of the present invention generally provide an efficient verification diagnostic for such single-crystal process fluid pressure sensors, and particularly sapphire-based pressure sensors. Effectively implementing diagnostics in accordance with embodiments of the present invention contributes to meter verification capabilities. Moreover, as the utilization of sapphire-based pressure sensors increases, the enhanced diagnostics will be useful in other contexts.

Figure 1:
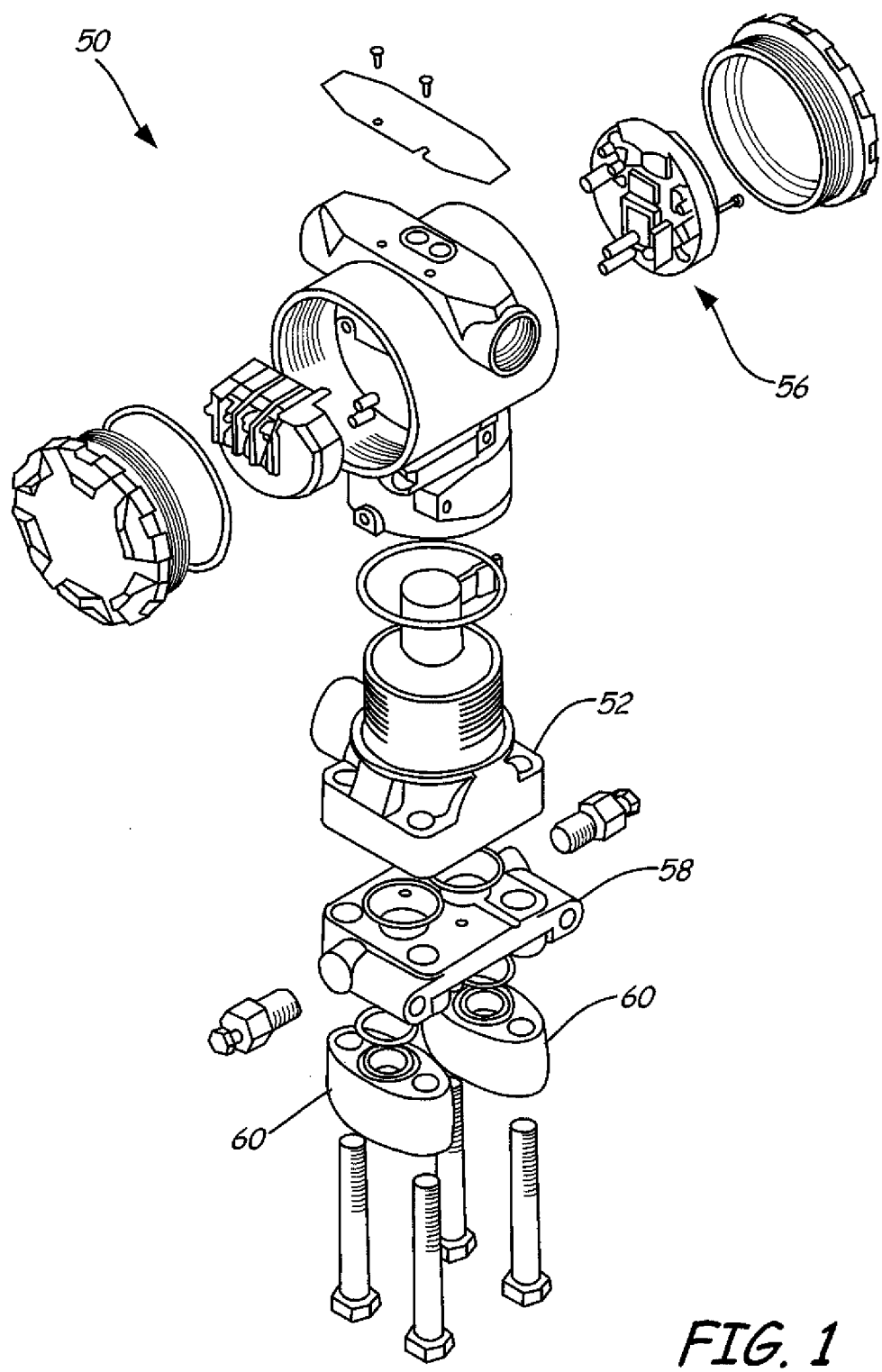
FIG. 1 is an exploded view of a process fluid pressure transmitter with which embodiments of the present invention are particularly useful.

FIG. 1 is an exploded view of a process fluid pressure transmitter 50 with which embodiments of the present invention are particularly useful. Transmitter 50 includes a flange 52 for receiving a differential pressure, two absolute pressure sensor capsules (not shown), and electronics 56. Transmitter 50 is bolted to flange adapter 58, which connects to impulse pipes connected to flange adapter union 60 or other connection hardware. The process fluid pressure transmitter depicted in FIG. 1 is exemplary only, and other process fluid pressure transmitters can be used with embodiments of the present invention. In particular, the absolute pressure process fluid pressure transmitter sold under the trade designation Rosemount® Model 4600 available from Emerson Process Management may also incorporate embodiments of the present invention.

Figure 2:
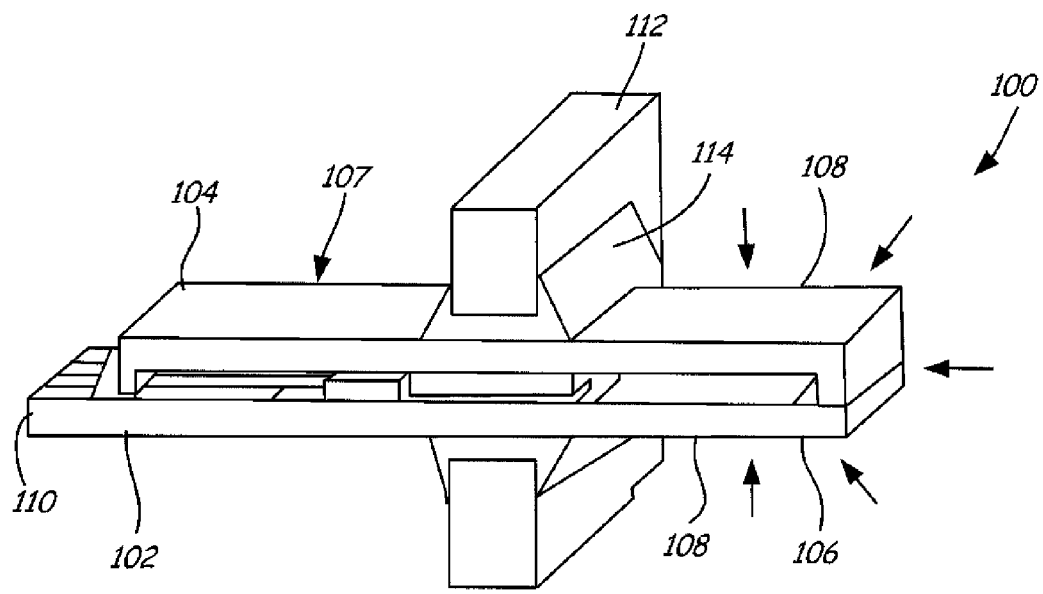
FIG. 2 is a diagrammatic view of a sapphire-based pressure sensor with which embodiments of the present invention are particularly useful.

FIG. 2 is a diagrammatic view of a single-crystal pressure sensor with which embodiments of the present invention are particularly useful. Pressure sensor 100 is generally arranged in the shape of a beam and is made of first layer 102 and second layer 104, both of which are constructed of a single-crystal material, such as sapphire. First layer 102 and second layer 104 are bonded together to form beam-shaped body 107 having a first end 106 with one or more diaphragms 108 adapted for fluid pressurization, and an opposite end 110. First and second ends 106, 110 are separated by a process fluid vessel wall 112. Essentially, pressure sensor 100 passes through an aperture in wall 112, and is brazed, welded, or otherwise secured thereto as indicated at reference numeral 114. The brazed mounting provides a fluid barrier so that pressurized process fluid does not reach electrical contact pads located at second end 110, avoiding corrosion of the contact pads by the pressurized fluid. The electrical contact pads and diaphragm(s) 108 are on opposite ends of beam-shaped sensor body 107, providing desired mechanical isolation, so that any force exerted by the electrical leads is greatly attenuated before it can reach pressure sensing diaphragm 108.

Figure 3:
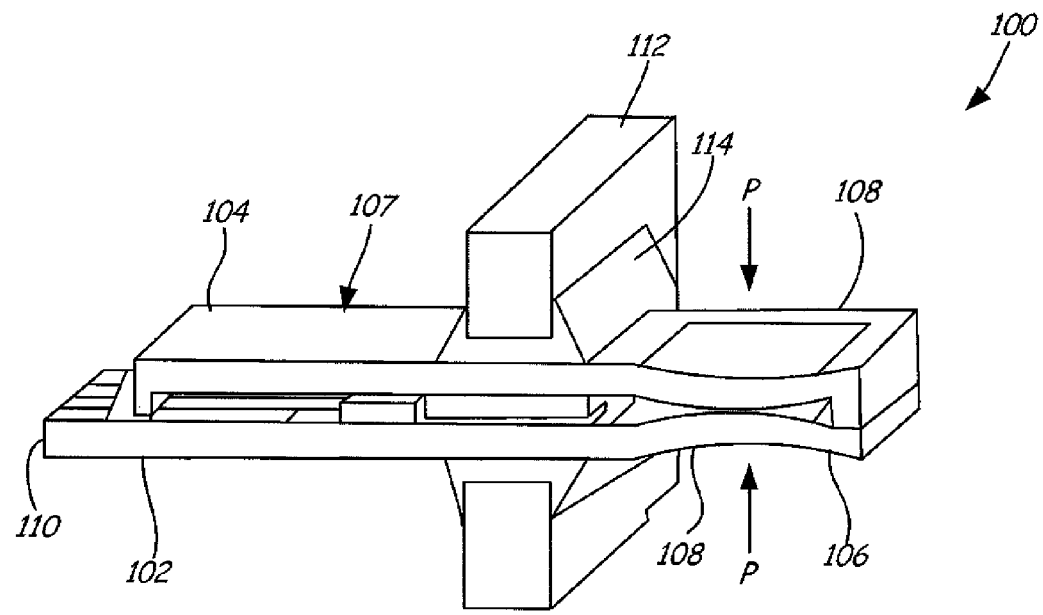
FIG. 3 is a diagrammatic view of the pressure sensor illustrated in FIG. 2 receiving a process fluid pressure (P).

FIG. 3 is a diagrammatic view of the pressure sensor illustrated in FIG. 2 receiving a process fluid pressure (P). As indicated, the process fluid pressure P results in an inward deformation of at least one of diaphragms 108 (the inward deflection is greatly exaggerated in FIG. 3). The deflection of at least one diaphragm 108 results in a displacement of capacitive plates bonded to interior surfaces of diaphragms 108. This displacement of the capacitive plates results in a change in capacitance between the capacitive plates, which is thus indicative of the applied process fluid pressure. The capacitive plates are one example of a pressure sensitive element that has an electrical characteristic that varies with applied pressure. Embodiments of the present invention could also be practiced using resistive strain gauges, for example.

It is important for the process industry to be able to verify that a pressure transmitter and/or pressure sensor is operating correctly. Pressure transmitter device diagnostics are currently limited in the ability to determine health of a sensor and sensor system particularly in the context of single-crystal deflectable diaphragm pressure sensors.

Sapphire-based pressure sensors are precision devices and it is important to be able to quickly and accurately determine verification of such sensors. Current sapphire-based process fluid pressure sensors generally provide a measurement capacitance (that varies based on deflection of at least one of the deflectable diaphragms), a reference capacitance (that does not vary with diaphragm deflection, but varies similarly to the measurement capacitance in all other regards, such as temperature) and a temperature measurement. Typically, such sensors have five terminations since the capacitance signals share a common lead.

Embodiments of the present invention generally leverage the temperature sensor, being a resistor, to be powered during a diagnostic test thereby creating I²R heat. The heat applied by the temperature sensor (momentary heater) will affect the pressure sensor by mechanically expanding the sensor structure. An example of a simple embodiment would be to hold the output at the last temperature compensated value of pressure; to divert a current through the temperature sensor; and to measure the transient response of the capacitance sensors and then to switch back to normal operation. An appropriate response to the temperature sensor-induced thermal pulse would indicate a healthy sensor, sensor electronics, and interconnections.

Note that sapphire-based process fluid pressure sensors typically measure absolute pressure with the internal volume of the sensor being at a vacuum. Therefore, heat does not cause a pressure change. If the sensor is immersed in an oil-filled system, such as for the Rosemount® Model 4600, the heat could potentially cause the oil to expand creating an increased pressure. However, it is believed that this increased pressure would generate an insignificant signal because of the relatively large volume of oil. Accordingly, an embodiment of this invention can be used with an oil-filled pressure sensor.

Figure 4:
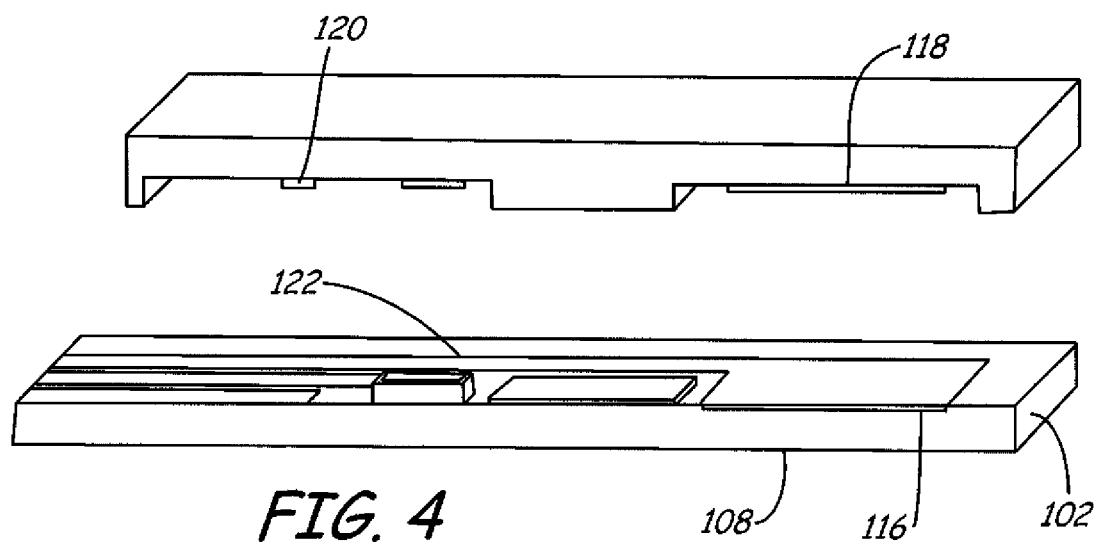
FIG. 4 is a diagrammatic exploded view of a sapphire-based process fluid pressure sensor with which embodiments of the present invention are particularly useful.

FIG. 4 is a diagrammatic exploded view of a sapphire-based process fluid pressure sensor with which embodiments of the present invention are particularly useful. Layer 102 includes sensor capacitor 116 disposed on an interior surface of deflectable diaphragm 108. Upper electrodes 118, 120 are provided to complete the sensing and reference capacitors relative to corresponding structures on layer 102. Temperature sensor 122 is preferably constructed from a high-temperature metal, such as tungsten, and has a nominal resistance of 1500 ohms, in one embodiment. The temperature coefficient of the tungsten RTD is relatively linear at 5.4 ohm/deg. C.

Figure 5:
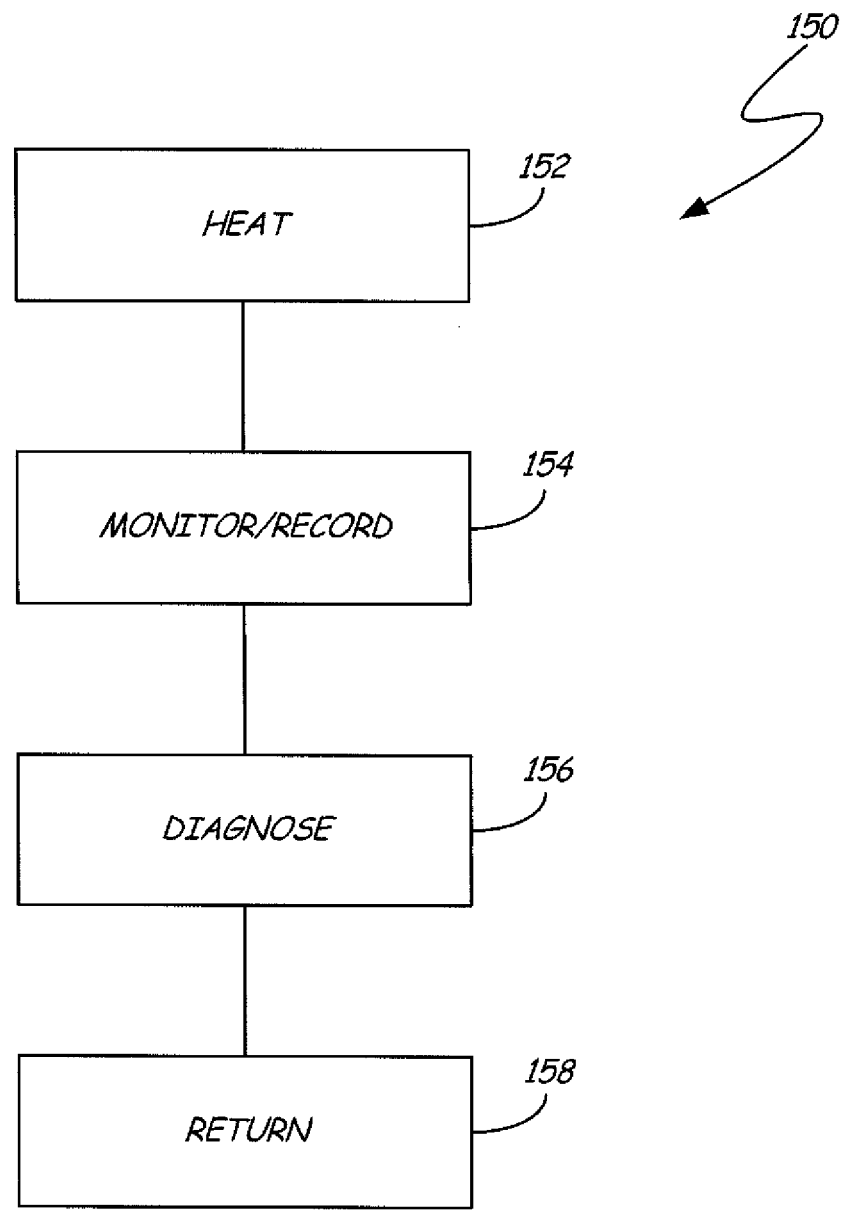
FIG. 5 is a flow diagram of a method of performing diagnostics on a sapphire-based pressure sensor in accordance with an embodiment of the present invention.

FIG. 5 is a flow diagram of a method of performing diagnostics on a sapphire-based pressure sensor in accordance with an embodiment of the present invention. Method 150 includes providing a single-crystal pressure sensor that is preferably constructed from sapphire and that has at least one electrical characteristic that varies with applied pressure and at least one resistive element therein. Method 150 begins at block 152 where the process fluid pressure sensor is heated or temporarily thermally shocked. The heat can be applied using any suitable heat source. Preferably, the heat is applied using a metal resistive element within the pressure sensor as a heating element. More preferably, this element doubles as a resistive temperature device. Power can be applied to the internal resistive element from any suitable source(s) including scavenged transmitter power, an internal storage system, such as a super-capacitor or a battery, transmitter loop power, external power, or any combination thereof. In embodiments where a super-capacitor is used, the super-capacitor can be trickle charged or charged during the diagnostic test sequence by diverting excess transmitter power (between quiescent current and 20 mA) into the capacitor for several minutes. Then, the super-capacitor is rapidly discharged into the temperature sensor to generate the heat pulse.

Regardless of the source of power for the heat, as the heat is applied, and even after the application of the heat, at least one electrical characteristic of the process fluid pressure sensor is monitored and/or recorded as indicated at block 154. The monitoring can include monitoring the resistance of the resistive element, monitoring the capacitance of a reference capacitance, monitoring the capacitance of a measurement capacitor, or any combination thereof. Next, at block 156, transmitter electronics, such as a microprocessor of the process fluid pressure transmitter, determines or otherwise characterizes a condition of the sensor based on the monitored and/or recorded sensor values and provides a verification output. This can be a task run exclusively on the transmitter during the diagnostic or it may be run as a background task during other transmitter operations. The analysis of the sensor response can include any or all of the following analytical techniques: measuring an output signal magnitude; determining a time constant of the signal; and/or determining a wave shape of the output signal. Finally, at block 158, the diagnostic process is complete and the pressure sensor returns to standard operation.

Method 150 can be initiated automatically via communication over a process communication loop, automatically when the process fluid pressure transmitter is energized, or periodically thereafter, and/or may be initiated manually by a technician interacting with a local user interface of the process fluid pressure transmitter.

Although the present invention has been described with reference to preferred embodiments, workers skilled in the art will recognize that changes may be made in form and detail without departing from the spirit and scope of the invention.

What is claimed is:

1. A method of verifying a condition of a single-crystal pressure sensor, the method comprising:
   providing a single-crystal pressure sensor having a cavity formed therein which carries a resistive element having a resistance which varies as a function of temperature, and a pressure sensitive element having at least one electrical characteristic that varies with applied pressure;
   sensing temperature based upon resistance of the resistive element;
   applying a current through the resistive element to heat the pressure sensor;
   monitoring at least one output of the pressure sensitive element to determine a response of the pressure sensor to the heat; and
   providing a verification output based on the response,
   wherein the resistive element comprises a temperature sensor disposed within the pressure sensor which is used to heat the pressure sensor in response to applied current.

2. The method of claim 1, wherein monitoring at least one output of the pressure sensor includes monitoring a first output.

3. The method of claim 2, wherein monitoring at least one output of the pressure sensor further includes monitoring a second output of the pressure sensor that does not have an electrical characteristic that varies with applied pressure.

4. The method of claim 3, wherein the second output is coupled to a reference capacitor of the single-crystal pressure sensor.

5. The method of claim 1, wherein monitoring at least one output of the pressure sensor includes monitoring a temperature sensor output.

6. The method of claim 1, wherein monitoring at least one output of the pressure sensor includes monitoring the at least one output while the current is applied.

7. The method of claim 1, wherein monitoring at least one output of the pressure sensor includes monitoring the at least one output immediately after the current is no longer applied.

8. The method of claim 1, wherein the steps of applying a current through the resistive element and monitoring the at least one output of the pressure sensor are performed with a process fluid pressure transmitter.

9. The method of claim 8, wherein the step of providing a verification output is performed by the process fluid pressure transmitter.

10. The method of claim 1, and further comprising exposing the sapphire-based pressure sensor to an incompressible fill fluid.

11. The method of claim 1, and further comprising exposing the sapphire-based pressure sensor to a process fluid.

12. The method of claim 1, wherein providing a verification output includes analyzing a magnitude of the monitored at least one output.

13. The method of claim 1, wherein providing a verification output includes analyzing a time constant of the monitored at least one output.

14. The method of claim 1, wherein providing a verification output includes analyzing a wave shape of the monitored at least one output.

15. The method of claim 1, wherein the current is applied by a process fluid pressure transmitter.

16. The method of claim 15, wherein the current is scavenged from process fluid pressure transmitter power.

17. The method of claim 15, wherein the current is provided by an internal power storage system of the process fluid pressure transmitter.

18. The method of claim 17, wherein the internal power storage system includes a super-capacitor.

19. The method of claim 17, wherein the internal power storage system includes a battery.

20. The method of claim 15, wherein the current is supplied from a process communication loop to which the process fluid pressure transmitter is coupled.

21. The method of claim 1, wherein the current is applied from an external power source.

22. The method of claim 1, wherein the method is performed by a process fluid pressure transmitter as a background task.

23. The method of claim 1, wherein the method is perform in response to a request for diagnostics.

24. The method of claim 23, wherein the request is received over a process communication loop.

25. The method of claim 24, wherein the request is received though a local user interface of a process fluid pressure transmitter.

26. The method of claim 1, wherein the single-crystal pressure sensor is constructed from sapphire.

27. The method of claim 1, wherein the pressure sensor comprises an elongate element having a cavity formed therein and including capacitive plates coupled to the cavity which provide relative movement in response to applied pressure, the electrical characteristic comprising electrical capacitance of the capacitive plates which is related to deflection of the cavity.

28. A process fluid pressure measurement system comprising:
   a process fluid pressure transmitter having transmitter electronics and being configured to measure an electrical characteristic of a process fluid pressure sensor and provide an indication of pressure over a process communication loop;
   a single-crystal process fluid pressure sensor coupled to the process fluid pressure transmitter, the process fluid pressure sensor including a cavity formed therein which carries a resistive element having a resistance which varies as a function of temperature and a pressure sensitive element having at least one electrical characteristic that varies with applied pressure; and
   wherein the process fluid pressure transmitter includes transmitter electronics configured to sense temperature of the resistive element based on resistance of the resistive element, apply a current to the resistive element of the single-crystal pressure sensor, monitor an electrical response of the process fluid pressure sensor to heat generated by the current by measuring the electrical parameter of the pressure sensitive element, and provide a verification output based on the electrical response;

wherein the resistive element comprises a temperature sensor disposed within the pressure sensor and which is used to heat the pressure sensor.

29. The process fluid pressure measurement system of claim 28, wherein the single-crystal process fluid pressure sensor is constructed from sapphire.

30. The process fluid pressure measurement system of claim 28, wherein the pressure sensor comprises an elongate element having a cavity formed therein and including capacitive plates coupled to the cavity which provide relative movement in response to applied pressure, the electrical characteristic comprising electrical capacitance of the capacitive plates which is related to deflection of the cavity.

* * * * *